United States Patent
Cornell et al.

(10) Patent No.: US 9,534,499 B2
(45) Date of Patent: Jan. 3, 2017

(54) METHOD OF EXTENDING THE SERVICE LIFE OF USED TURBOCHARGER COMPRESSOR WHEELS

(71) Applicant: Caterpillar Inc., Peoria, IL (US)

(72) Inventors: Sean Olen Cornell, Gridley, IL (US); Marvin Grendel McKimpson, Metamora, IL (US); Yong Tian, Peoria, IL (US); Dong Fei, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 671 days.

(21) Appl. No.: 13/856,657

(22) Filed: Apr. 4, 2013

(65) Prior Publication Data

US 2013/0272889 A1     Oct. 17, 2013

Related U.S. Application Data

(60) Provisional application No. 61/623,695, filed on Apr. 13, 2012.

(51) Int. Cl.
| | |
|---|---|
| *B63H 1/26* | (2006.01) |
| *F01D 7/00* | (2006.01) |
| *F01D 5/00* | (2006.01) |
| *F02C 6/12* | (2006.01) |
| *F04D 29/28* | (2006.01) |
| *F04D 25/02* | (2006.01) |

(Continued)

(52) U.S. Cl.
CPC ............. *F01D 7/00* (2013.01); *F01D 5/005* (2013.01); *F02C 6/12* (2013.01); *F04D 25/024* (2013.01); *F04D 27/001* (2013.01); *F04D 29/023* (2013.01); *F04D 29/284* (2013.01); *F05D 2220/40* (2013.01); *F05D 2230/80* (2013.01); *F05D 2230/90* (2013.01); *F05D 2300/121* (2013.01); *Y10T 29/49316* (2015.01)

(58) Field of Classification Search
USPC .. 415/118; 416/219 A, 219 R, 220 A, 223 R, 416/248, 202, 223 A, 209; 73/112.01, 73/112.03, 112.05
See application file for complete search history.

(56) References Cited

U.S. PATENT DOCUMENTS

| | | | |
|---|---|---|---|
| 4,335,997 A * | 6/1982 | Ewing | F01D 5/048 416/185 |
| 4,659,288 A * | 4/1987 | Clark | F01D 5/048 228/193 |

(Continued)

FOREIGN PATENT DOCUMENTS

| | | |
|---|---|---|
| CN | 88100955 | 9/1988 |
| CN | 1037475 | 11/1989 |

(Continued)

*Primary Examiner* — Binh Q Tran
(74) *Attorney, Agent, or Firm* — Miller, Matthias & Hull LLP

(57) ABSTRACT

A method is provided for extending the service life of a used metallic compressor wheel having a damaged surface. The method generally comprises the steps of inspecting the used compressor wheel for material discontinuities such as fatigue cracks and, if fatigue cracks exceeding a predetermined length are not present, renewing the used compressor wheel such as by peening. The inspection process comprises conducting a non-destructive examination of the used compressor wheel to detect cracks larger than those which would fall generally within the compressive stress zone that is generated by peening.

22 Claims, 6 Drawing Sheets

(51) Int. Cl.
*F04D 27/00* (2006.01)
*F04D 29/02* (2006.01)

(56) References Cited

U.S. PATENT DOCUMENTS

| | | | | |
|---|---|---|---|---|
| 4,741,203 A * | 5/1988 | Willaman | ............ | G01N 27/902 415/118 |
| 5,625,664 A | 4/1997 | Berkley | | |
| 5,675,892 A | 10/1997 | Mannava et al. | | |
| 5,735,044 A | 4/1998 | Ferrigno et al. | | |
| 6,159,619 A | 12/2000 | Rockstroh et al. | | |
| 6,164,931 A | 12/2000 | Norton et al. | | |
| 6,341,936 B1 | 1/2002 | Cowie et al. | | |
| 6,994,526 B2 | 2/2006 | Furman et al. | | |
| 7,118,335 B2 | 10/2006 | Vacarezza et al. | | |
| 7,399,371 B2 | 7/2008 | Tominaga et al. | | |
| 7,431,565 B2 * | 10/2008 | Hernandez | ............ | B23P 6/005 416/219 R |
| 7,451,639 B2 * | 11/2008 | Goldfine | ................ | G01B 7/285 73/112.01 |
| 7,543,500 B2 * | 6/2009 | Litzenberg | ........... | G01N 29/043 73/593 |
| 7,582,174 B2 | 9/2009 | Vigneau | | |
| 8,006,544 B2 * | 8/2011 | Holmes | ................. | G01M 15/14 73/112.01 |
| 8,292,501 B1 * | 10/2012 | Stein | ................... | F04D 15/0088 374/121 |
| 8,297,922 B2 * | 10/2012 | Cruickshank | ......... | F04D 29/289 416/1 |
| 8,601,689 B2 * | 12/2013 | Hathiwala | ............... | F01D 5/005 29/402.11 |
| 8,720,056 B2 * | 5/2014 | Mega | ...................... | B23H 9/10 29/402.07 |
| 8,743,196 B2 * | 6/2014 | Fritz | ...................... | F03D 1/003 348/92 |
| 8,959,767 B2 * | 2/2015 | Staroselsky | ............. | B23P 6/002 29/402.19 |
| 2005/0158460 A1 | 7/2005 | Williams | | |
| 2006/0168809 A1 | 8/2006 | McCarvill et al. | | |
| 2007/0107217 A1 | 5/2007 | Baus et al. | | |
| 2008/0127476 A1 | 6/2008 | Prevey | | |
| 2009/0004364 A1 | 1/2009 | Hollis et al. | | |
| 2009/0269206 A1 | 10/2009 | Yelistratov et al. | | |
| 2009/0282678 A1 | 11/2009 | Williams et al. | | |
| 2009/0313823 A1 | 12/2009 | Rockstroh et al. | | |
| 2010/0205805 A1 | 8/2010 | Mega et al. | | |
| 2011/0229338 A1 | 9/2011 | Voong et al. | | |

FOREIGN PATENT DOCUMENTS

| | | |
|---|---|---|
| CN | 201344151 | 11/2009 |
| EP | 2119870 | 11/2009 |
| WO | 2006051285 | 5/2006 |

* cited by examiner

Surface Acoustic Wave Apparatus

Shear Wave Apparatus

Eddy current testing

METHOD OF EXTENDING THE SERVICE LIFE OF USED TURBOCHARGER COMPRESSOR WHEELS

TECHNICAL FIELD OF THE DISCLOSURE

This disclosure relates generally to extending the service life of metallic compressor wheels, and, more particularly, to a method of extending the service life of used turbocharger compressor wheels.

BACKGROUND OF THE DISCLOSURE

The use of turbochargers to increase engine performance is well known. Simply put, turbochargers increase the mass of air supplied to an engine, resulting in improved engine performance.

A typical turbocharger comprises a turbine wheel connected to a compressor wheel by a rotatable shaft. Hot engine exhaust gas powers (rotates) the turbine wheel which drives the compressor wheel. The compressor wheel draws in relatively cool ambient air and compresses it before it enters the engine intake manifold.

Compressor wheels operate at very high speeds, often up to 90,000 RPM in large turbochargers used in some heavy duty vehicles and up to 250,000 RPM in automobiles. Over time the compressor wheel can become subject to fatigue failure due to the high speeds or a high cycle (on-off) rate. Replacing the compressor wheel with a new compressor wheel is expensive.

It is known in the industry that shot peening improves the service life of metal components. For example, shot peening of fatigue damaged aluminum parts to extend service life has been practiced in the aerospace industry.

What was not heretofore known was a method of extending the service life of used compressor wheels comprising an inspection step and a renewing step, wherein the inspection step comprises conducting a non-destructive examination of the used compressor wheel to detect cracks larger than those which would fall generally within the compressive stress zone that is generated with peening to identify used compressor wheels that are candidates for renewal, and the renewing step comprises peening to impart compressive residual stresses in those surface regions of the compressor wheel subject to the highest fatigue loadings.

SUMMARY OF THE DISCLOSURE

It would therefore be beneficial to provide a method for extending the service life of metallic compressor wheels, such as used turbocharger compressor wheels, so that the compressor wheels can be put back into service.

A further object of the present invention is to provide method of inspecting and renewing used compressor wheels, wherein the inspection step comprises conducting a non-destructive examination of the used compressor wheel to detect cracks larger than those which would fall generally within the compressive stress zone that is generated with peening to identify used compressor wheels that are candidates for renewal, and the renewing step comprises peening to impart compressive residual stresses in those surface regions of the compressor wheel subject to the highest fatigue loadings.

A still further objective of the invention is to provide a used turbocharger compressor wheel that has been renewed according to the method described herein.

In accordance with one aspect of the present disclosure, there is provided a method for extending the service life of a used turbocharger compressor wheel having a damaged surface or sub-surface. The method generally comprises the steps of inspecting the used compressor wheel for material discontinuities such as fatigue cracks and, if fatigue cracks are not present, or are present but not larger than a specified length, renewing the used compressor wheel such as by shot peening.

The inspection step may be accomplished using a non-destructive technique such as ultrasonic inspection and/or eddy current testing. Preferably the inspection step comprises inspecting the back face of the compressor wheel using ultrasonic inspection and inspecting the front face of the compressor wheel in the vicinity of the blade roots using eddy current testing, for fatigue cracks exceeding a predetermined length.

In one embodiment of the invention the compressor wheel is discarded if the detected fatigue cracks exceed about 200 microns in length. In another embodiment the compressor wheel is discarded if the detected fatigue cracks exceed about 100 microns in length. In still another embodiment the compressor wheel is discarded if any fatigue cracks are detected.

If the compressor wheel meets the predetermined criteria for renewability during the inspection step it becomes a candidate for renewal. During the renewing step peening may be used to impart a layer of residual compressive stress to the compressor wheel to extend its service life. The compressor wheel can then be returned to service in a turbocharger.

The disclosure further describes and claims a used turbocharger compressor wheel having a surface renewed in accordance with the method described herein. The used turbocharger compressor wheel comprises a hub and blades radiating outward from the hub and affixed to the hub along blade roots. The hub has a curved front face to which the blades are attached and a curved back face. The blade roots and back face have been inspected for fatigue cracks and renewed by peening.

DETAILED DESCRIPTION OF THE DISCLOSURE

While this invention may be embodied in many forms, there is shown in the figures and will herein be described in detail one or more embodiments, with the understanding that this disclosure is to be considered an exemplification of the principles of the invention and is not intended to limit the invention to the illustrated embodiments.

In the description that follows the following terms are used:

"Material discontinuities" may refer to fatigue cracks, fractures, scratches, dents, dings and other types of damage located within the compressive stress zone of an object, typically on the surface or near the surface of the object.

"Renewing" may refer to any suitable way to impart compressive stresses in an object to improve fatigue resistance, including peening such as by shot peening and compressive burnishing operations such as by roll burnishing.

Turbocharger Operation

Figure 1:
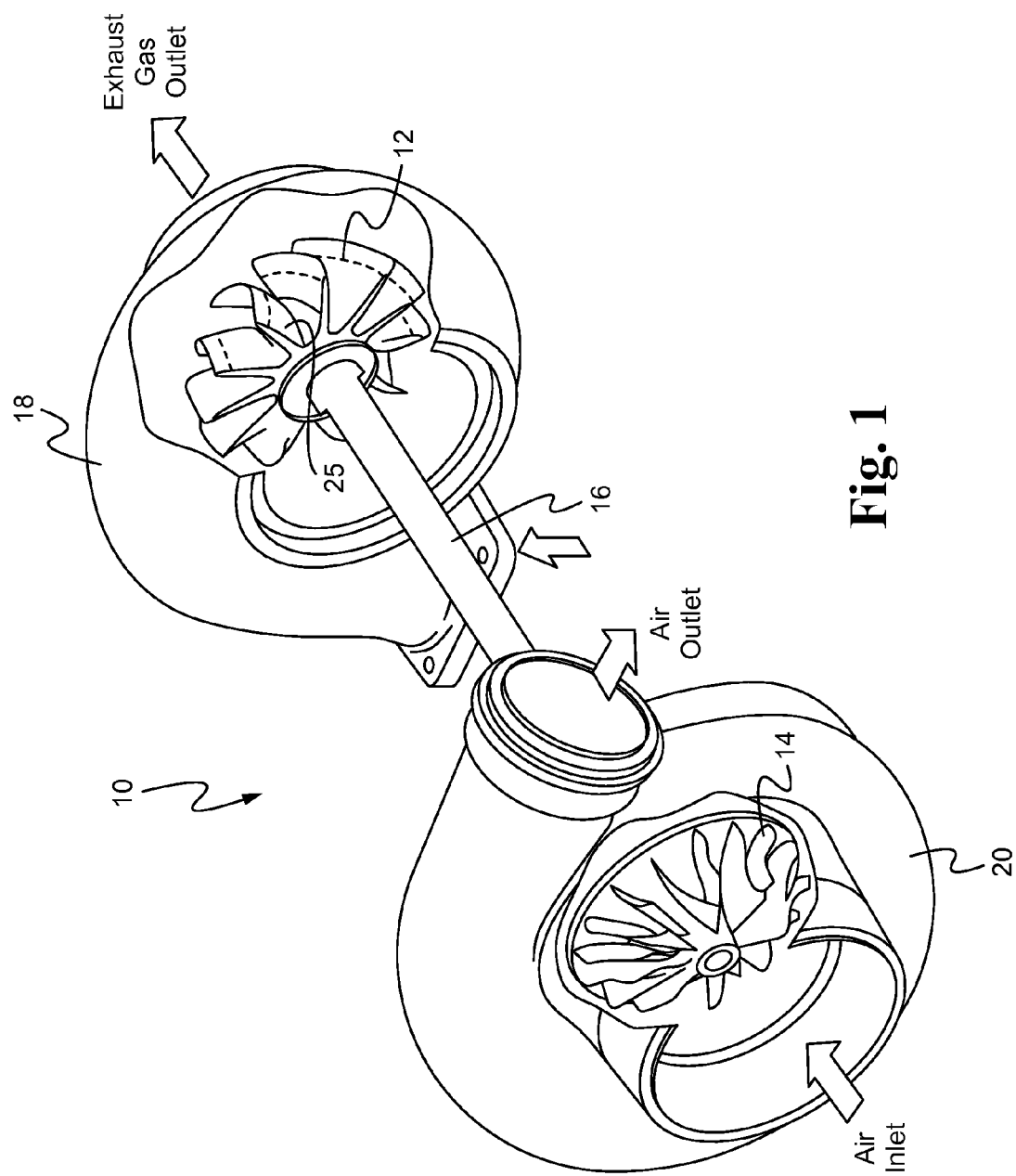
FIG. 1 is a perspective view of the main components of a typical turbocharger, including a compressor wheel.

As shown in FIG. 1, a typical turbocharger 10 comprises a turbine wheel 12 connected to a compressor wheel 14 by a rotatable shaft 16. The turbine wheel 12 is housed within a turbine housing 18 and the compressor wheel 14 is housed within a compressor housing 20. A center housing (not shown) located between the turbine housing 18 and the compressor housing 20 houses the rotatable shaft 16.

During operation, hot engine exhaust gas rotates the turbine wheel 12 before exiting the turbine housing 18 as turbine exhaust gas. The rotation of the turbine wheel 12 drives the rotatable shaft 16 which drives the compressor wheel 14. The rotating compressor wheel 14 draws in relatively cool ambient air and expels compressed air into the engine intake manifold (not shown), greatly increasing the volumetric efficiency beyond that of naturally-aspirated engines.

Compressor wheels operate at very high speeds, often up to 90,000 RPM in large turbochargers used in some heavy duty vehicles and up to 250,000 RPM in automobiles. Over time the compressor wheel can become subject to fatigue failure due to the high speeds or a high cycle (on-off) rate. Replacing the compressor wheel with a new compressor wheel is expensive. The present invention addresses the need for a method of improving the service life of turbocharger compressor wheels so that the compressor wheels can be reused.

Compressor Wheels

Figure 2:
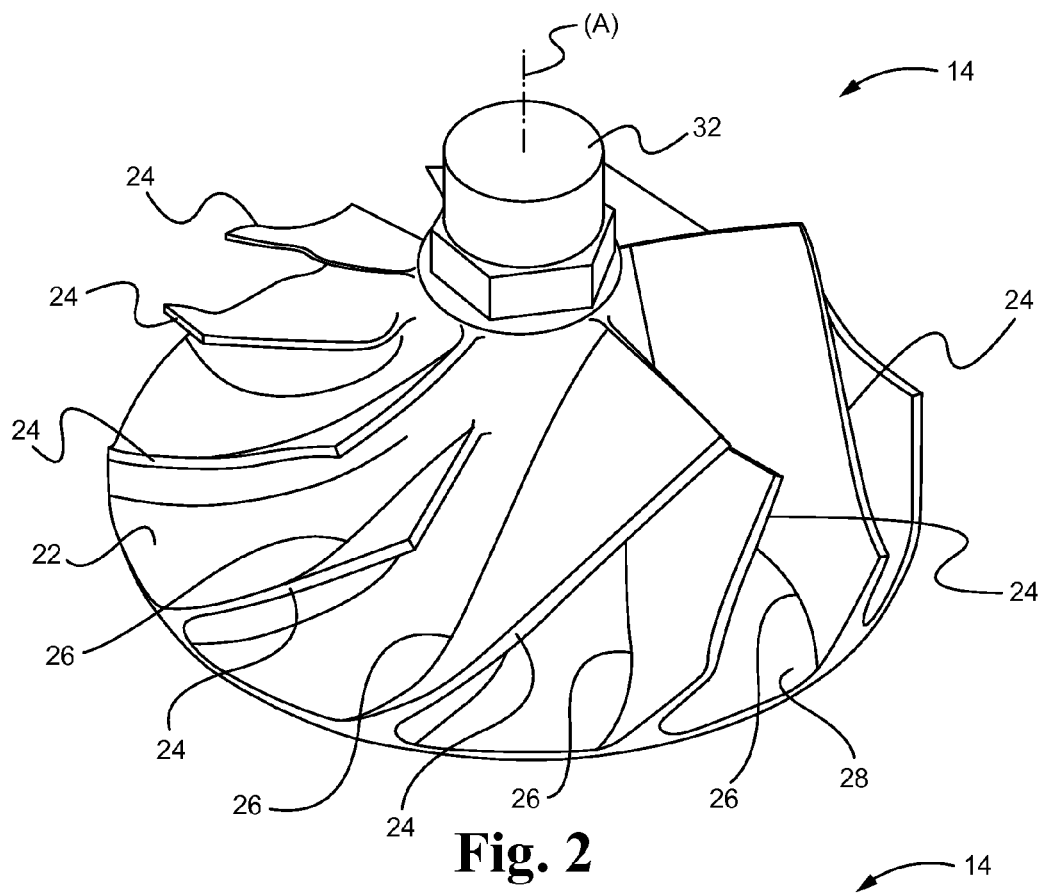
FIG. 2 is a perspective view of a conventional turbocharger compressor wheel like that shown in FIG. 1.
Figure 3:
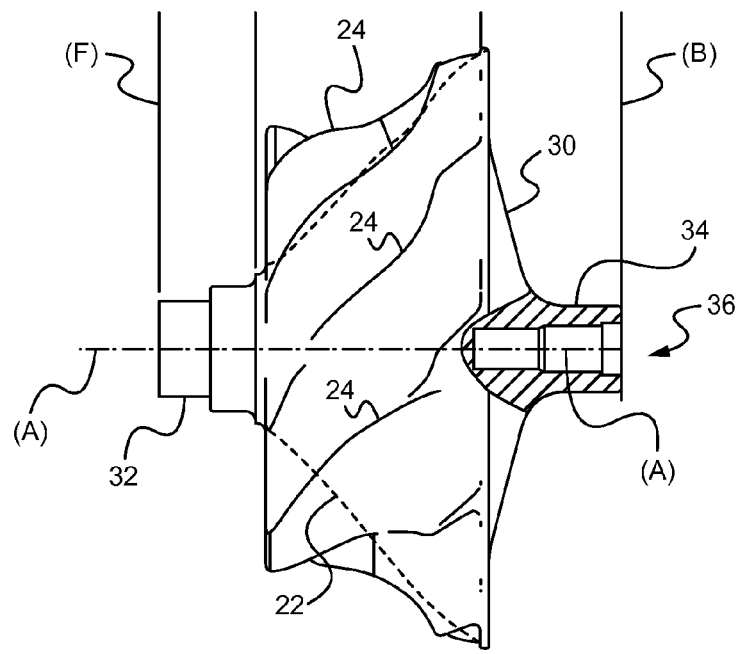
FIG. 3 is a side elevational view of the turbocharger compressor wheel of FIG. 2.

FIG. 2 is a perspective view a typical compressor wheel 14 of the type that is a candidate for the renewal process described and claimed herein. FIG. 3 is a side view of a similar compressor wheel 14. As explained above, the compressor wheel 14 operates within the compressor housing 20 and is mounted on a shaft 16 driven by a turbine wheel 12. The compressor wheel 14 rotates about an axis (A) in response to the rotation of the shaft 16.

The compressor wheel 14 comprises a bell shaped central hub 22 mountable to the rotating shaft 16, and blades 24 radiating outward from the hub 22 and affixed to the hub 22 along blade roots 26. In the illustrated embodiment the blades 24 extend from the hub 22 at an angle, so one side of each blade 24 defines an acute angle with respect to the hub 22 while the other side defines an obtuse angle with respect to the hub 22.

The hub 22 has a front face 28 to which the blades 24 are attached and a smooth, curved back face 30. The hub 22 extends from a front plane (F) to a back plane (B). The hub 22 may include a front hub extension 32 extending axially forward from the front face 28 and terminating at the front plane (F) and a rear hub extension 34 extending axially rearward from the back face 30 and terminating at the back plane (B). The hub 22 defines a bore 36 that may extend through the entire length of the hub 22, or just partway through the hub 22 as shown in FIG. 3. The compressor wheel 14 is engineered to be symmetrical about the center axis (A).

A typical compressor wheel may have a total outer diameter of between about 100 millimeters (mm) and about 150 mm (roughly four to six inches), although the invention may be used on metallic compressor wheels outside this size range.

The material of construction for the types of compressor wheels 14 that are good candidates for the present renewing process is aluminum, although it should be understood that the invention is not limited to aluminum compressor wheels. The compressor wheels may be machined out of a forged aluminum block, although cast wheels may also be candidates for the present renewing process.

Typically, the portion of the compressor wheel 14 under the highest stress is the curved back face 30, and this is where most fatigue failures occur. In addition, the blade roots 26 may also be susceptible to stress and fatigue failure. These and other areas of the compressor wheel 14 may be renewed according to the process described herein.

It is hypothesized that early stage fatigue cracks tend to form either on the back face 30 or at the blade roots 26. Under non-destructive examination (NDE), indications of the early stage fatigue cracks may be very small, on the order of 100 microns (0.1 mm) or less in length, and develop primarily on the back face 30, either on the surface or near the surface, due to some metallurgical discontinuity in the wheel.

Previously, the detection of any cracks, especially cracks over 200 microns in length, would result in the used compressor wheel being discarded. The present invention allows re-use of used compressor wheels with microfractures up to and including the 100-200 micron length range.

The Method

Figure 4:
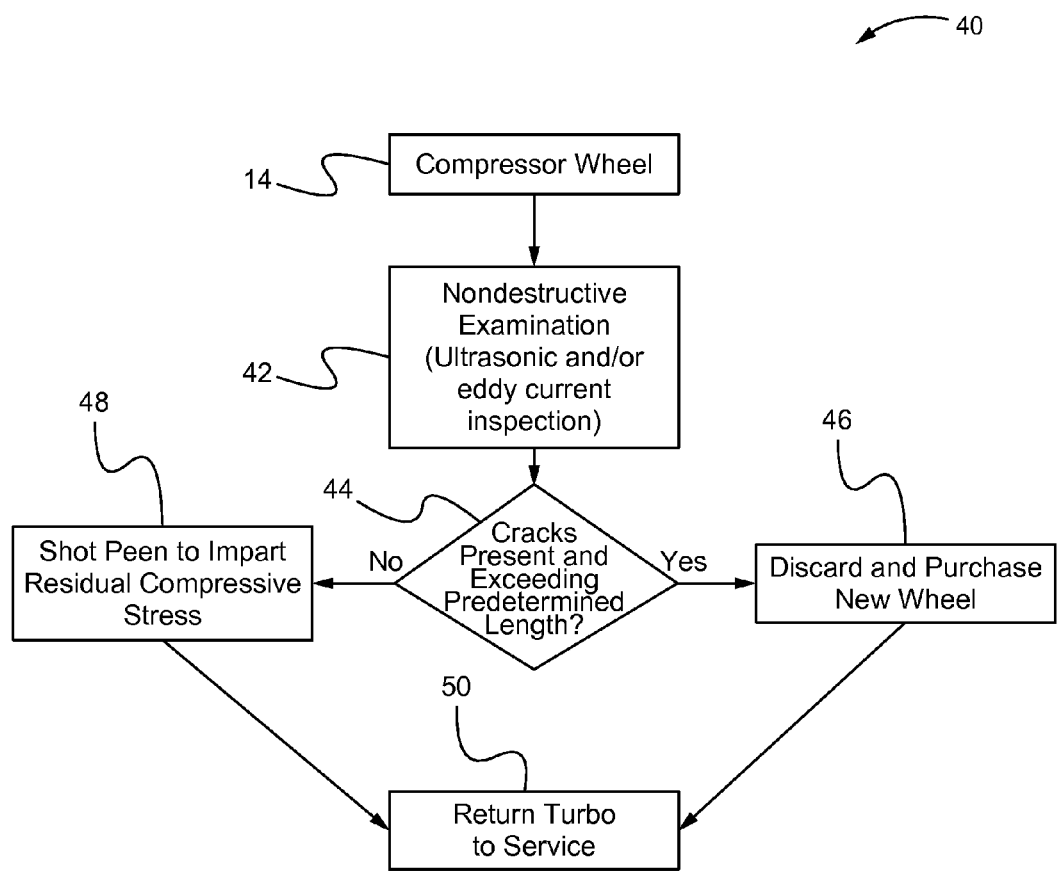
FIG. 4 is a diagram of a method of inspecting and renewing a used turbocharger compressor wheel according to the present invention.

In the embodiment of the invention illustrated in FIG. 4, the method 40 generally comprises an inspection step 42 and a renewing step 48 as explained in detail below. The inspection step 42 may be preceded by various optional cleaning and visual inspection operations.

I. Inspection Step

The inspection step 42 comprises inspecting the used compressor wheel 14 for damage in the form of fatigue cracks or microfractures, preferably by ultrasonic inspection (UI) and/or eddy current testing. UI is the preferred method for detecting cracks in the compressor wheel back face 30, while eddy current testing is the preferred method for detecting cracks in the compressor wheel front face 28 along the compressor wheel blade roots 26.

UI is a non-destructive, acoustically based method of detecting flaws in a target object. UI uses high frequency sound energy to conduct examinations and make measurements. UI can be used for flaw detection and evaluation, dimensional measurements, material characterization and other functions. When using UI, an operator aims a sound beam at the target object and, by comparing the echo pattern to a reference standard, can detect flaws in the target object. A surface or subsurface crack that is approximately normal to the sound beam can cause an echo. By increasing the frequency of the sound waves the resolution of the echo pattern can be increased, thereby enabling the operator to detect smaller cracks. Applicants have found that UI can be used on used compressor wheels to detect early fatigue cracks having lengths as small as 200 microns, and possibly 100 microns or less.

To perform UI, a probe is moved in 100 micron increments across the surface of the compressor wheel 14 and, more particularly, across the surface of the back face 30. If cracks are indicated, the operator counts how many pixels are included in that indication. The smallest crack may have only one pixel, corresponding to a 100 micron crack. The actual size of the crack is presumed to be close to the measurement. In other words, the size of the crack is estimated based on the magnitude of the detected ultrasonic indication. Decreasing the probe movement increment may improve the probability of detecting small cracks and the sizing accuracy, but will significantly increase the total inspection time.

At least two UI techniques may be utilized with the present invention: surface acoustic wave (SAW) inspection and shear wave (SW) inspection. Shear wave (SW) inspection is preferred mainly because in general (1) it shows a high contrast for small cracks, (2) it can detect deeper flaws in the compressor wheel, (3) it is less sensitive to the geometric change of the wheel, and (4) it is easier to perform the inspection.

Surface Acoustic Wave (SAW) Inspection

Figure 5:
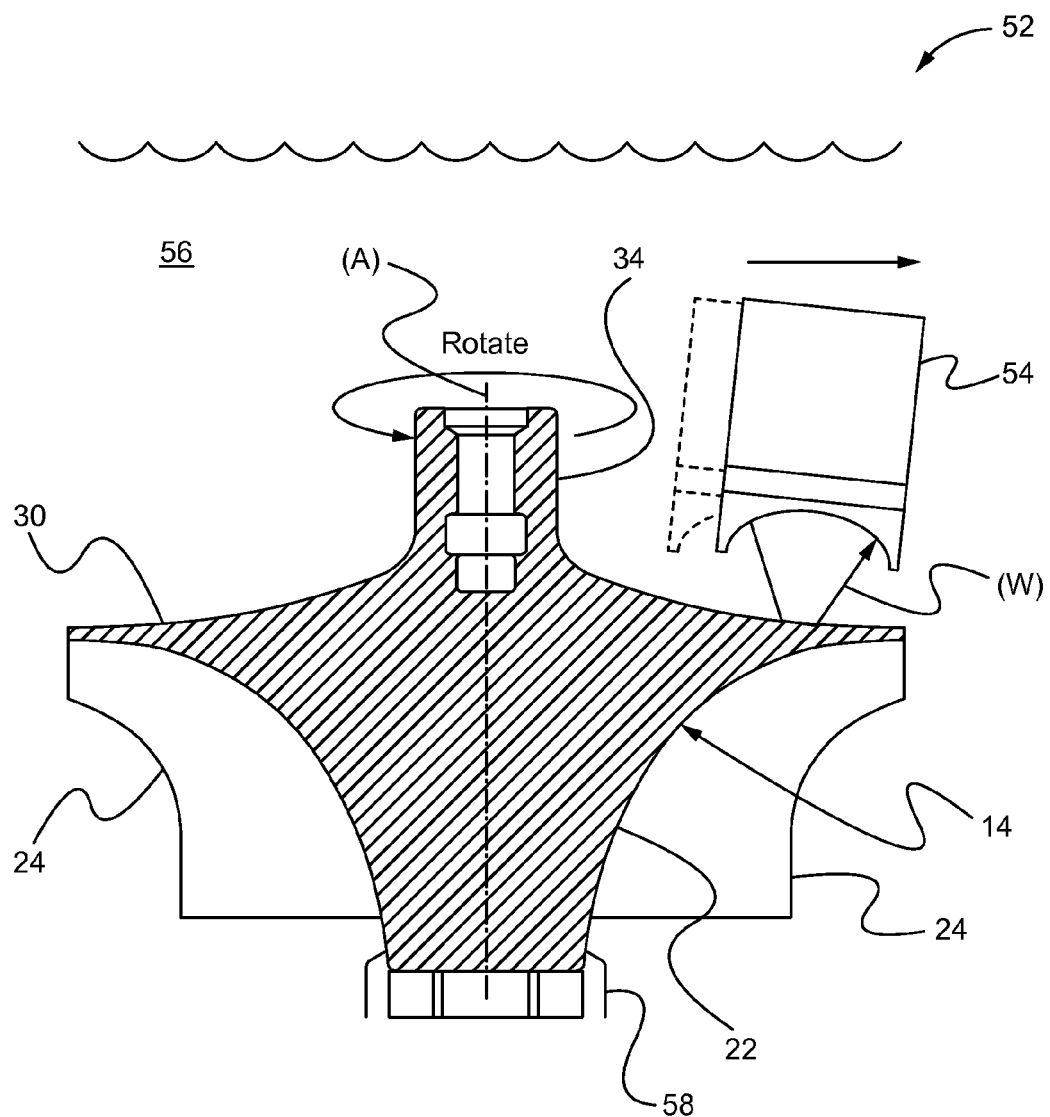
FIG. 5 is a schematic view of a surface acoustic wave apparatus of the kind that may be used in accordance with the present invention to detect fatigue cracks in a compressor wheel back face.

FIG. 5 is a schematic view of a surface wave acoustic apparatus 52 of the kind that may be used in accordance with the present invention to detect fatigue cracks in a compressor wheel back face 30. For SAW inspection, the operator couples a spherically focused SAW transducer 54 (sound wave generator) to a target object, such as by immersing both the transducer 54 and target object (compressor wheel 14) in a sound carrying medium such as water 56. The transducer 54 generates an ultrasonic acoustic wave (W) and directs it to the target object to generate a SAW at the target surface. After propagating a short distance at the target surface, the SAW is received by the transducer 54. A surface crack or a subsurface crack within one wavelength of the SAW will block the propagation of the SAW and thus be detected. The use of a spherically focused transducer enables the operator to detect a crack of any orientation in the target surface.

When the target object is a used compressor wheel 14, the compressor wheel 14 may be held by a chuck 58 mounted on a rotating turntable (not shown) and positioned with the compressor wheel back face 30 facing up. The compressor wheel 14 may be rotated about its axis (A) with respect to the transducer 54, allowing the operator to inspect an 8 mm wide circumferential ring on the surface of the back face 30. The transducer 54 can then be moved to the next position and a new 8 mm wide ring inspected.

When performing a SAW inspection, the axis of the transducer 54 ideally should be perpendicular to the surface of the target and the distance between the transducer 54 and target surface ideally should be kept constant. Since a compressor wheel has a curved back surface, ideally the orientation and position of the transducer 54 should be continuously adjusted with respect to the change of surface curvature throughout the inspection process. This can be achieved by using an advanced ultrasonic scanning system that has an automatic contour following feature. To perform this inspection process using a simpler system, the operator may fix the axis of probe for about every 8 mm normal to the axial direction (A) of the compressor wheel 14.

For example, when beginning an inspection the operator may position the transducer 54 at a first angle ("angle 1") with respect to the compressor wheel back face 30 in order to inspect a first annular region of the compressor wheel back face 30, i.e., a ring shaped region 8 mm wide normal the axial direction (A). During the inspection, the wheel 14 is rotated and the transducer 54 is moved normal to the axial direction (A). After inspecting the first annual region, the operator changes the axis of the transducer 54 to a second angle ("angle 2") to inspect the next annular region ("region 2").

Generally speaking, the SAW method cannot detect cracks deeper than one wavelength of the surface acoustic wave because the surface acoustic wave decays rapidly in the depth direction. For example, in an aluminum target object, when a 50 MHz transducer is used, one wavelength corresponds to about 60 microns. When a 15 MHz surface wave transducer is used, one wavelength corresponds to about 200 microns. Decreasing the frequency will increase the penetration depth of the SAW, but decrease the detection sensitivity to small cracks.

Shear Wave (SW) Inspection

Figure 6:
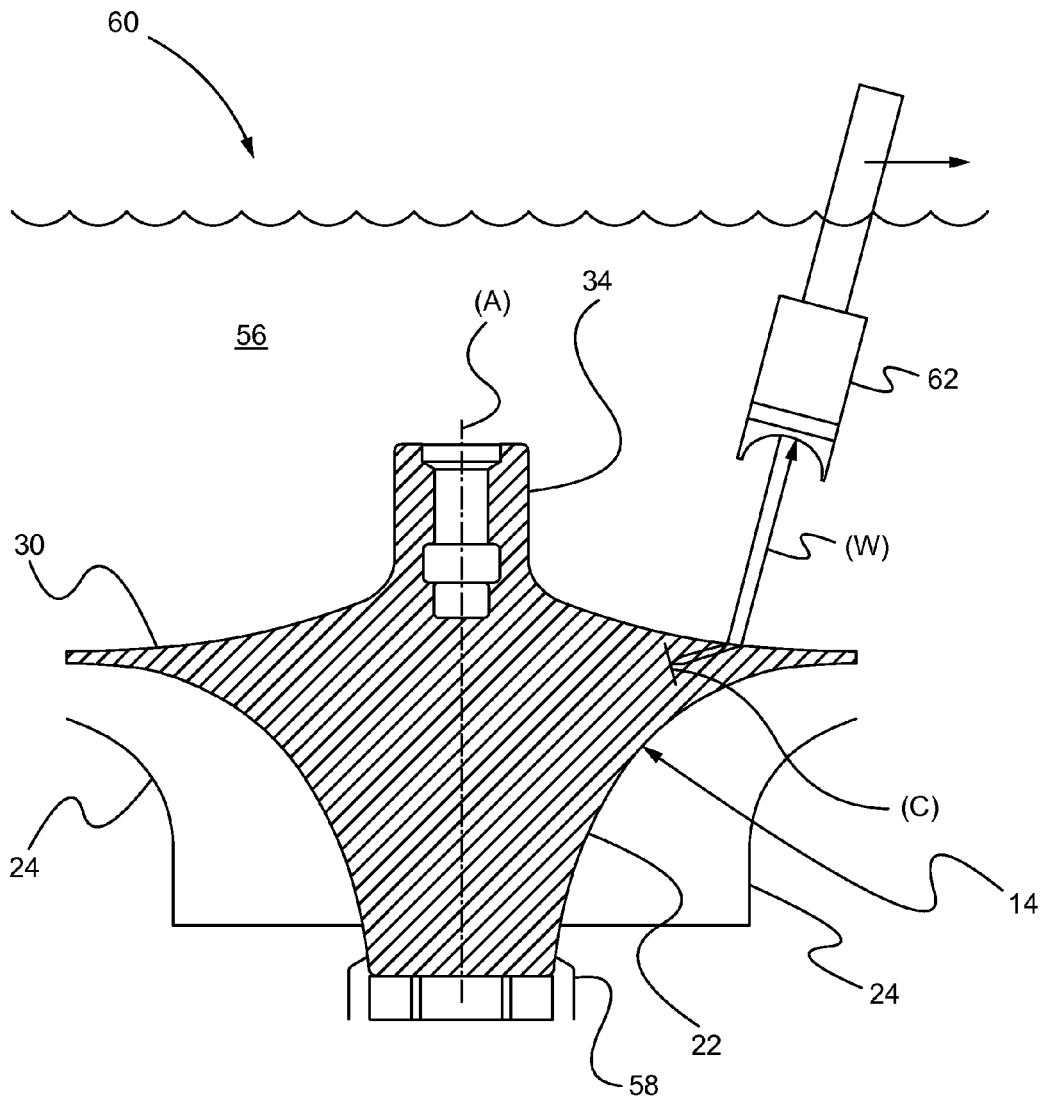
FIG. 6 is a schematic view of a shear wave apparatus of the kind that may be used in accordance with the present invention to detect fatigue cracks in a compressor wheel back face.

FIG. 6 is a schematic view of a shear wave apparatus 60 of the kind that may be used in accordance with the present invention to detect fatigue cracks in a used compressor wheel 14. Like the SAW inspection apparatus, the SW apparatus 60 includes a transducer 62 and a target object immersed in a sound carrying medium such as water 56. In shear wave inspection, the operator aims the transducer 62 at the target part at an incident angle. The incident angle is set so that the refracted shear wave in the target propagates nearly parallel to the target surface, making it very sensitive to surface or near surface cracks that are nearly perpendicular to the target surface. For example, in an aluminum target and water coupling medium, the incident angle is about 28.6°.

When the target object is a used compressor wheel 14, the compressor wheel 14 may be held stationary while the transducer 62 is moved, covering an area about 30 mm in length. A surface or subsurface crack (C) that is approximately normal to the ultrasonic acoustic wave (W) will cause an echo and thus be detected. The shear wave method generally is capable of detecting deeper cracks than the surface acoustic wave method. The transducer used is spherically focused and can generate and detect a spectrum of ultrasonic waves that have slightly different orientations with respect to the center axis of the transducer. This allows for the detection of both surface and subsurface cracks, and cracks that are not ideally oriented. The shear wave method can only detect cracks at one primary orientation with respect to the transducer 62. However, it is expected that most fatigue cracks on the back face 30 will be oriented normal to the compressor wheel axis (A) due to the loading pattern of the compressor wheel, so the transducer 62 can be oriented accordingly.

Similar to SAW inspection, since a compressor wheel has a curved back surface, ideally the orientation and position of the transducer 62 should be continuously adjusted with respect to the change of surface curvature throughout the inspection process. This can be achieved by using an advanced ultrasonic scanning system with a contour following feature. The shear wave method is less sensitive to the geometric change than the SAW method. To perform the SW inspection using a simpler system, the operator may fix the axis of probe for about 30 mm normal to the axial direction (A) of compressor wheel 14.

Comparison of SAW to SW

The following table compares SAW and SW:

TABLE 1

COMPARISON OF SURFACE ACOUSTIC WAVE (SAW) INSPECTION AND SHEAR WAVE (SW) INSPECTION

|  | SAW | SW |
| --- | --- | --- |
| Transducer options | Limited, specialized, expensive, bulky | Many choices, standard, low cost, compact |
| Transducer orientation | Perpendicular to the target surface | At an angle (other than 90 degrees) to the target surface |
| Distance between target and transducer | Small | Can be much larger than SAW |
| Ability to detect small cracks |  | Better than SAW |
| Area covered |  | Wider than SAW (due to smaller transducer size) |
| Speed of inspection | Same | Same |
| Ability to detect cracks | Any orientation in surface | Limited to cracks primarily normal to acoustic beam |
| Can detect cracks below surface? | Yes, up to 60 microns below surface for 50 MHz (and up to 200 microns for 15 MHz with less sensitivity to small cracks). | Yes, up to 200 microns and deeper. |
| Ease of inspection |  | Easier |

The shear wave (SW) inspection has several advantages over the SAW inspection. For example, the SW inspection employs a standard transducer that has many choices of frequency, element diameter, and focal length. The transducer is also relatively low cost and often readily available. By contrast, the transducer used in the SAW method is often specialized, bulky and expensive. Second, the SAW inspection method requires the transducer to be placed very close the target surface, whereas in SW inspection, the transducer can be placed much further away, making it easier to set up and perform the inspection. Third, the ultrasonic image obtained from shear wave (SW) inspection has a higher contrast, and thus the SW inspection is more capable of revealing smaller defects than SAW inspection. The SW inspection can also detect deeper cracks than the SAW inspection. In addition, because the SW inspection is less sensitive to the target geometric change and the transducer is more compact, it can cover a wider region in the target surface than the SAW inspection. However, the SAW inspection can detect cracks at any orientation in target surface, while the SW inspection is only sensitive to cracks that are primarily normal to the sound beam.

Eddy Current Testing

As previously noted, eddy current testing is the preferred method for detecting cracks on the compressor wheel front surface 28 along the blade roots 26 because of the relative complexity of the blade root geometry. In eddy current testing, an eddy current probe is used to introduce electromagnetic fields in an electrically conductive target. Material discontinuities such as cracks will disturb the flow of the electromagnetic field, and these disturbances change the impedance of the eddy current probe through induction. Eddy current testing can be used to detect cracks in or near the surface of the target and can be used on targets having complex geometries, such as the blade root area of a used compressor wheel.

Figure 7:
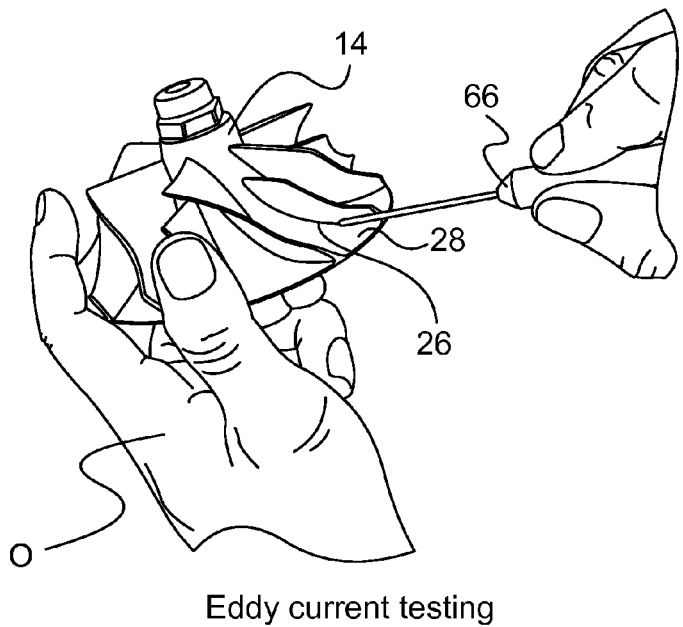
FIG. 7 is a perspective view of a compressor wheel undergoing eddy current testing in the vicinity of the blade roots.

As shown in FIG. 7, eddy current testing may be done manually, i.e., by an operator (O) holding the eddy current probe 66. The probe 66 is guided along the blade root 26 to detect very small cracks.

Referring back to FIG. 4, upon completion of the inspection step 42 the operator determines whether fatigue cracks are present and, if so, whether they are greater than a maximum allowable length required for renewability (step 44). If there are fatigue cracks present exceeding a certain size, the compressor wheel is discarded and a new compressor wheel must be purchased as indicated graphically by step 46.

In one embodiment of the invention the compressor wheel is discarded if the detected fatigue cracks exceed about 200 microns in length. In another embodiment the compressor wheel is discarded if the detected fatigue cracks exceed about 100 microns in length. In still another embodiment the compressor wheel is discarded if any fatigue cracks are detected.

II. Renewing Step

If the compressor wheel meets the selected criteria for renewability described above during the inspection step, for example and by way of illustration only, if there are no fatigue cracks present, the used compressor wheel becomes a candidate for renewal. During the renewing step 48, peening may be used to impart a layer of residual compressive stress to the compressor wheel to extend its service life so that it can be returned to service. The compressor wheel can then be returned to service in a turbocharger as indicated at step 50.

The renewing step 48 generally comprises peening those surface regions of the compressor wheel 14 subject to the highest fatigue loadings to impart compressive residual stresses on those regions, such as the back face 30 and the front (blade side) face 28, especially near the blade roots 26. Any suitable peening process may be used, including shot peening and laser peening. If shot peening is used, it may be accomplished with any suitable media, including steel shot, glass beads and ceramic beads. Alternatively, other ways to impart compressive stresses may be used, including compressive burnishing such as roll burnishing.

Figure 8:
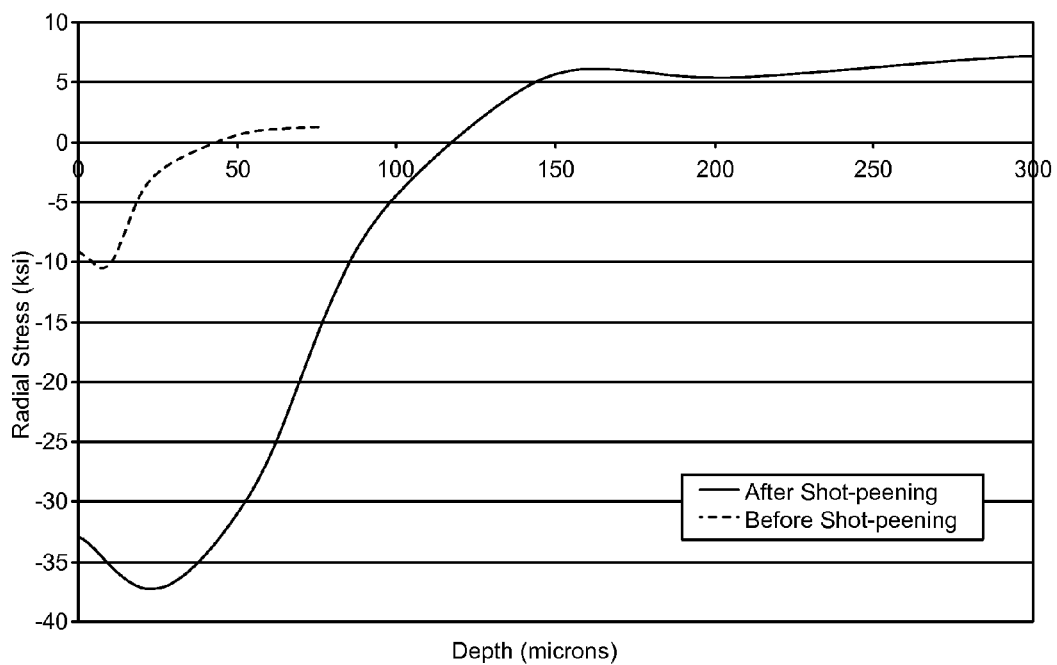
FIG. 8 is a plot of radial stress as a function of depth in a used compressor wheel before and after shot peening.

FIG. 8 shows a sample radial stress measurement of a used compressor wheel before and after shot peening as a function of depth. Depth (in microns) is shown on the x-axis and radial stress (in kilopounds per square inch; 1 ksi=1000 psi) is shown on the y-axis. A negative radial stress reading indicates compressive residual stress, which is beneficial to service life. A positive radial stress reading indicates tensile residual stress, which is detrimental to service life. As indicated in the figure, compressive residual stress is much stronger and deeper after peening. For example, after shot peening the depth of the zone of compressive residual stress, a.k.a. the compressive stress zone, is about 120 microns compared to only about 45 microns before shot peening. It follows that a crack or other material discontinuity larger than about 200 microns or even 100 microns in length may extend under the compressive zone and thus be harmful to the service life of the compressor wheel. Therefore the present method of extending the service life of a used compressor wheel is most suitable when no fatigue cracks are detected, but may still be useful when cracks have been detected having lengths no greater than 100 microns or even possibly no greater than 200 microns.

INDUSTRIAL APPLICABILITY

A method has been described of salvaging a used turbocharger compressor wheel so that it can be re-used. The re-use of salvaged turbocharger compressor wheels has the potential to reduce operator costs by extending the life of compressor wheels. The techniques described herein have general applicability but are particularly suitable for forged aluminum compressor wheels. While cast wheels can cost about $50, forged aluminum wheels can cost $800-1000. Increasing their lifetime by a factor of two can make them more competitive with cast wheels.

Thus there has been described a process for inspecting and renewing used compressor wheels. The inspection step comprises conducting a non-destructive examination of a compressor wheel to detect fatigue cracks larger than those which would fall generally within the compressive stress zone that is generated with peening to identify used compressor wheels that are candidates for renewal, and the renewing step comprises peening to impart compressive residual stresses in those surface regions of the compressor wheel subject to the highest fatigue loadings. The invention has pushed the state of the art in non-destructive evaluation coupled with the capabilities of the renewal process, i.e. the depth that an operator can impart compressive residual stresses in a used compressor wheel.

The present process results in a renewed surface having surprising thermal stability. One skilled in the art might expect the stresses generated from peening to degrade or relax over time because of the high service temperature of the compressor wheel. While such thermal relaxation may occur over time, it is believed that it occurs at a rate slow enough so that peening still provides a useful increase in service life.

Economics

The present invention can save time and money. A new forged compressor wheel can cost about $800 to $1200 and have an average lifetime of about 10,000 hours. Any time a turbocharger is taken out of service, even for addressing an issue unrelated to the compressor wheel, the compressor wheel is replaced. For example, if a structural issue with the compressor housing requires that the housing be repaired after 4,000 service hours, the compressor wheel typically is replaced even though it technically could serve for another 6,000 hours before its replacement would be required. Renewing a used turbocharger compressor wheel as shown in FIG. 4 can extend its lifetime another 10,000 hours at any time during its initial service life.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A method for extending the service life of a used metallic compressor wheel having a hub rotatable about an axis and blades radiating outward from the hub and affixed to the hub along blade roots, the hub having a curved front face to which the blades are attached, the curved front face curving axially in a first direction, and a curved back face positioned opposite the front face and curving axially in a second direction opposite the first direction, the method comprising the steps of:
   inspecting the used compressor wheel for material discontinuities; and
   if a material discontinuity exceeding a predetermined length is detected, discarding the used compressor wheel; but
   if such a material discontinuity is not detected, renewing at least one of the blade roots and curved back face by peening.

2. The method of claim 1 wherein:
   the inspecting step comprises inspecting the back face using ultrasonic inspection.

3. The method of claim 1 wherein:
   the inspecting step comprises inspecting the blade roots using eddy current testing.

4. The method of claim 2 wherein:
   the inspecting step further comprises inspecting the blade roots using eddy current testing.

5. The method of claim 2 wherein the predetermined length is about 200 microns.

6. The method of claim 2 wherein the predetermined length is about 100 microns.

7. The method of claim 2 wherein the predetermined length is zero microns.

8. The method of claim 2 wherein, after the inspecting step, if a material discontinuity is detected, then the compressor wheel is discarded.

9. The method of claim 1 wherein the regions of the used compressor wheel subject to the highest fatigue loadings comprise the back face and the blade roots.

10. The method of claim 9 wherein the used compressor wheel is machined out of a forged aluminum block.

11. The method of claim 1 wherein the inspecting step comprises conducting a non-destructive examination of the used compressor wheel to detect material discontinuities larger than those which would fall generally within the compressive stress zone that is generated by renewing.

12. The method of claim 11 wherein, if a material discontinuity is detected having a length larger than that which would fall generally within the compressive stress zone that is generated by renewing, the used compressor wheel is discarded.

13. A used turbocharger compressor wheel comprising:
   a hub rotatable about an axis; and
   blades radiating outward from the hub and affixed to the hub along blade roots;
   the hub having a curved front face to which the blades are attached, the curved front face curving axially in a first direction, and a curved back face positioned opposite the front face and curving axially in a second direction opposite the first direction; wherein one of the back face and blade roots has been inspected for material discontinuities and renewed by peening to impart compressive residual stresses in the back face or blade roots.

14. The used turbocharger compressor wheel of claim 13 wherein the used compressor wheel is made of forged aluminum.

15. The used turbocharger compressor wheel of claim 13 wherein:
   prior to renewing, the back face has been inspected by conducting a non-destructive examination and found not to comprise material discontinuities larger than a predetermined length.

16. The used turbocharger compressor wheel of claim 15 wherein:
   the predetermined length is 200 microns.

17. The used turbocharger compressor wheel of claim 15 wherein:
   the predetermined length is 100 microns.

18. The used turbocharger compressor wheel of claim 15 wherein:
   the predetermined length is 0 microns.

19. The used turbocharger compressor wheel of claim 13 wherein:
   the blade roots have been inspected for material discontinuities.

20. The used turbocharger compressor wheel of claim 19 wherein:
   prior to renewing, the blade roots and back face have been inspected by conducting a non-destructive examination and found not to comprise material discontinuities larger than those which would fall generally within the compressive stress zone that is generated during renewing.

21. The used turbocharger compressor wheel of claim 13, wherein the hub is bell shaped.

22. The used turbocharger compressor wheel of claim 13, wherein the compressor wheel was originally formed by casting or forging.

* * * * *

UNITED STATES PATENT AND TRADEMARK OFFICE
CERTIFICATE OF CORRECTION

Page 1 of 1

PATENT NO.        : 9,534,499 B2
APPLICATION NO.   : 13/856657
DATED             : January 3, 2017
INVENTOR(S)       : Cornell et al.

It is certified that error appears in the above-identified patent and that said Letters Patent is hereby corrected as shown below:

In the Specification

Column 1, Line 4, below 'Title' insert -- CROSS-REFERENCE TO RELATED APPLICATION
This application is based upon and claims the benefit of priority from U.S. Provisional Application
No. 61/623,695, filed Apr. 13, 2012, the contents of which are expressly incorporated herein by
reference. --.

Signed and Sealed this
Ninth Day of May, 2017

Michelle K. Lee
*Director of the United States Patent and Trademark Office*